(12) United States Patent
Arnold et al.

(10) Patent No.: US 6,362,313 B1
(45) Date of Patent: Mar. 26, 2002

(54) ALLYL PENDENT HOMO- AND CO-POLYMERIC SYSTEMS

(75) Inventors: Fred E. Arnold; Thuy D. Dang, both of Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/780,705

(22) Filed: Feb. 13, 2001

(51) Int. Cl.$^7$ .................................. C08G 73/56

(52) U.S. Cl. .................. 528/423; 528/288; 528/272; 528/290; 528/293; 528/295; 528/373; 528/397; 528/425

(58) Field of Search ................................ 528/423, 288, 528/272, 290, 293, 295, 373, 397, 425

(56) References Cited

U.S. PATENT DOCUMENTS

| | | | | |
|---|---|---|---|---|
| 5,001,217 A | * | 3/1991 | Tsai et al. .................. | 528/337 |
| 5,098,987 A | * | 3/1992 | Tsai et al. .................. | 528/183 |
| 5,492,996 A | * | 2/1996 | Dang et al. ................. | 528/171 |
| 6,057,417 A | | 5/2000 | Arnold et al. | |

OTHER PUBLICATIONS

T.D. Dang, N. Venkatasubramanian, F.E. Arnold, Aromatic Benzobisazole Polymers Based On 1H–Pyrazole, Polymer Preprints, vol. 41, No. 1, Mar. 2000, Published Feb. 22, 2000, pp217–218.

* cited by examiner

*Primary Examiner*—Duc Truong
(74) *Attorney, Agent, or Firm*—Charles E. Bricker; Thomas L. Kundert

(57) ABSTRACT

Allyl pendent benzazole polymer system having repeating units of the formula:

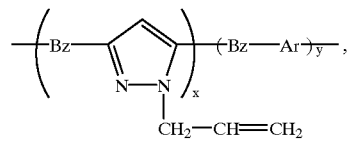

wherein Bz is a benzazole unit selected from the group consisting of

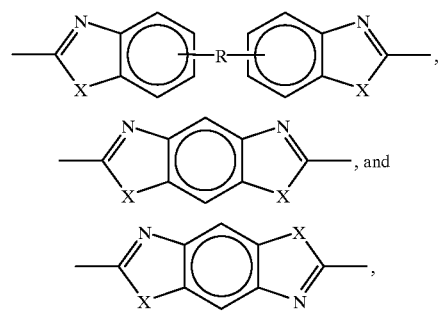

wherein X is —O—, —S— or —NH—, and R is selected from the group consisting of

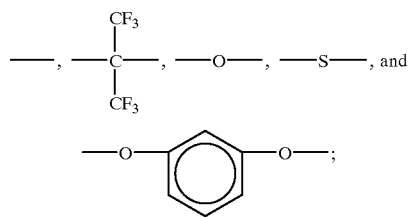

wherein Ar is an aromatic group; and wherein x has a value of about 1.0 to 0.1 and y has a value of 1.0–x.

4 Claims, No Drawings

ALLYL PENDENT HOMO- AND CO-POLYMERIC SYSTEMS

RIGHTS OF THE GOVERNMENT

The invention described herein may be manufactured and used by or for the Government of the United States for all governmental purposes without the payment of any royalty.

BACKGROUND OF THE INVENTION

The present invention relates to new high performance polymer and copolymer compositions for extended-life coating applications.

Coating primer requirements for advanced coating technology have become more stringent than those provided by the-state-of-the-art materials. Commercial materials utilized for primers generally last between 3 and 7 years. The removal of such primers involves high cost with respect to both materials and labor. Failure of these materials is primarily due to delamination (adhesive failure), and acid rain. The labor costs of applying and removing failed primers is considerable; accordingly, new coating materials are required that are acid stable and have extended-life times of 30+ years of service.

We have synthesized new acid stable material compositions based on benzazole homo- and co-polymer systems, tailored with allyl pendent groups for maximizing processability and properties. Benzazole polymers are very acid stable since they are prepared in polyphosporic acid (PPA) at about 180° C. The introduction of pyrazole groups along the backbone of the benzazole polymer allows post-polymer reactions to incorporate allyl pendent groups utilized for free radical crosslinking reactions.

Accordingly, it is an object of the present invention to provide new crosslinkable material compositions based on benzazole homo- and co-polymer systems.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a new benzazole polymers/copolymer system. This new polymer system has repeating units of the formula:

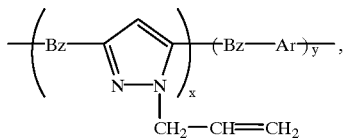

wherein Bz is a benzazole unit selected from the group consisting of

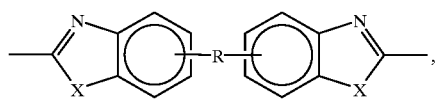

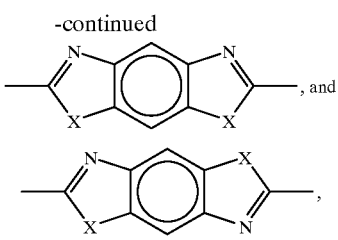

wherein X is —O—, —S— or —NH—, and R is selected from the group consisting of

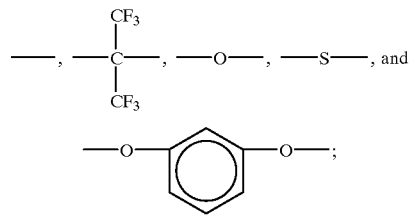

wherein Ar is an aromatic group; and wherein x has a value of about 1.0 to 0.1 and y has a value of 1.0–x.

DETAILED DESCRIPTION OF THE INVENTION

The polymers and copolymers of this invention are derived from 1-H-pyrazole-3,5-dicarboxcylic acid. The incorporated pyrazole repeat unit allows for post-polymer reactions to provide allyl pendent groups which can be utilized to cure or crosslink the polymer/copolymer units.

The homopolymers are prepared by the condensation of approximately equimolar amounts of 1-H-pyrazole-3,5-dicarboxcylic acid (PDC) and a benzazole precursor such as

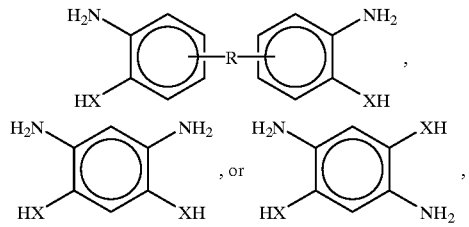

wherein R and X are as defined previously, in polyphosporic acid (PPA) at about 180° C., following procedures well known in the art, then recovered, also using procedures well known in the art.

The copolymers are prepared in similar manner by the condensation of approximately equimolar amounts of (a) a mixture of 1-H-pyrazole-3,5-dicarboxylic acid (PDC) and an aromatic dicarboxylic acid, and (b) a benzazole precursor as defined above.

The pyrazole-containing homo- and copolymer compositions are then derivatized utilizing the pyrazole proton. Derivatization of these compositions is carried out by treatment with sodium hydride in anhydrous DMSO to form dark red viscous polyanions. One equivalent of sodium hydride is used per pyrazole repeat unit. After complete dissolution of the polyanion, excess allylbromide is added and the mixture heated to about 40–60° C. The resulting derivatized polymer/copolymer is recovered by precipitation into water, followed by soxhlet extraction with heptane to remove unreacted allylbromide. The pendent allyl polymer/copolymer can be crosslinked using the appropriate free radical-initiating reagents.

The following examples illustrate the invention:

EXAMPLE I

Polymer I Derived from BAHH and PDC

Into the bottom of a 250 ml resin flask, equipped with a high torque mechanical stirrer, and a nitrogen inlet/outlet, were placed 3.6626 g (10 mmole) of 2,2-bis(3-amino-4-hydroxyphenyl)hexafluoropropane (BAHH), 1.7411 g (10 mmole) of 3,5-pyrazole dicarboxylic acid monohydrate (PDC), and 33.47 g of 83% polyphosphoric acid (PPA). The monomers were incorporated into PPA by stirring and heated slowly to 100° C. under a dry nitrogen flow in an oil bath. The solution was heated at 100° C. for a period of 16 hours, 140° C. for one hour, 160° C. for 2 hours, and finally at 185° C. for 24 hours. At the end of the polymerization, the viscous polymer dope was precipitated into water. The resultant fibrous polymer was chopped in a Waring blender, collected by suction filtration, washed with ammonium hydroxide, then soxhlet extracted with water for 24 hours, and finally dried under reduced pressure (0.002 torr) at 100° C. for 24 hours. The polymer yield was 4.48 g. An intrinsic viscosity of 1.2 dl/g was measured in methanesulfonic acid at 30° C., and at a concentration of 0.25 g/dl.

EXAMPLE II

Polymer II Derivatization from Polymer I

Into the bottom of a 250 ml, three-neck, round-bottom flask equipped with a mechanical stirrer, thermometer, and a nitrogen inlet/outlet was charged with 50 g anhydrous dimethylsulfoxide (DMSO). The solvent was stirred under nitrogen for 30 minutes, after which time 0.22 g of sodium hydride (60% dispersion in oil) was added. The solution was heated to 75° C. for a period of one hour, during which the sodium hydride dissolved and the clear solution took a greenish tint. The solution was cooled to 40° C.; and 1.00 g of polymer I ($\eta$=1.2 dl/g, methanesulfonic acid, 30° C.; 0.25 g/dl) was added. The suspension was stirred for 16 hours at 40° C. during which time the polymer completely dissolved and a red, homogenous solution resulted. The solution was cooled to room temperature, and 0.3 g (2.5 mmole) of allyl bromide was added. The mixture was stirred under slightly positive nitrogen for 16 hours during which time the polymer solution became yellow and finally precipitated out the polymer. The mixture was poured into 500 ml of water and allowed to stir until the polymer was broken into a fine suspension; the polymer was collected by suction filtration, and extracted in a Soxhlet extraction apparatus with hexane for 24 hours. The polymer was dried under vacuum (0.002 torr) at 100° C. for 24 hours. The polymer yield was 1.14 g. An intrinsic viscosity of 1.41 dl/g (methanesulfonic acid, 30° C.; 0.25 g/dl) was recorded for the polymer.

EXAMPLE III

Copolymer III Derived from BAHH and 50% of PDC and 50% of BCPH

Into the bottom of a 250 ml resin flask, equipped with a high torque mechanical stirrer, and a nitrogen inlet/outlet, were placed 3.6626 g (10 mmole) of 2,2-bis(3-amino-4-hydroxyphenyl)hexafluoropropane, 0.8705 g (5 mmole) of 3,5-pyrazole dicarboxylic acid monohydrate, 1.9613 g (5 mmole) of 2,2-bis(4-carboxyphenyl)hexafluoropropane (BCPH), and 40.96 g of 83% polyphosphoric acid (PPA). The monomers were incorporated into PPA by stirring and heated slowly to 100° C. under a dry nitrogen flow in an oil bath. The solution was heated at 100° C. for a period of 16 hours, 140° C. for one hour, 160° C. for 2 hours, and finally at 185° C. for 24 hours. At the end of the polymerization, the viscous polymer dope was precipitated into water. The resultant fibrous polymer was chopped in a Waring blender, collected by suction filtration, washed with ammonium hydroxide, then soxhlet extracted with water for 24 hours, and finally dried under reduced pressure (0.002 torr) at 100° C. for 24 hours. The polymer yield was 5.66 g. An intrinsic viscosity of 1.38 dl/g was measured in methanesulfonic acid at 30° C., and at a concentration of 0.25 g/dl.

EXAMPLE IV

Copolymer IV Derivatization of Copolymer III

Into the bottom of a 250 ml, three-neck, round-bottom flask equipped with a mechanical stirrer, thermometer, and a nitrogen inlet/outlet was charged with 25 g anhydrous dimethylsulfoxide (DMSO). The solvent was stirred under nitrogen for 30 minutes, after which time 0.11 g of sodium hydride (60% dispersion in oil) was added. The solution was heated to 75° C. for a period of one hour, during which the sodium hydride dissolved and the clear solution took a greenish tint. The solution was cooled to 40° C., and 1.00 g of polymer III ($\eta$=1.38 d/lg, methanesulfonic acid, 30° C.; 0.25 g/dl) was added. The suspension was stirred for 16 hours at 40° C. during which time the polymer completely dissolved and a red, homogenous solution resulted. The solution was cooled to room temperature, and 0.2 g (2.5 mmole) of allyl bromide was added. The mixture was stirred under slightly positive nitrogen for 16 hours during which time the polymer solution became yellow and finally precipitated out the polymer. The mixture was poured into 500 ml of water and allowed to stir until the polymer was broken into fine suspension, the polymer was collected by suction filtration, and extracted in a Soxhlet extraction apparatus with hexane for 24 hours. The polymer was dried under vacuum (0.002 torr) at 100° C. for 24 hours. The polymer yield was 1.1 g. An intrinsic viscosity of 1.42 dl/g (methanesulfonic acid, 30° C.; 0.25 g/dl) was recorded for the polymer.

EXAMPLE V

Copolymer V Derived from BAHH and 25% of PDC and 75% of BCPH

Into the bottom of a 250 ml resin flask, equipped with a high torque mechanical stirrer, and a nitrogen inlet/outlet, were placed 3.6626 g (10 mmole) of 2,2-bis(3-amino-4-hydroxyphenyl)hexafluoropropane, 0.4353 g (2.5 mmole) of 3,5-pyrazole dicarboxylic acid monohydrate, 2.9419 g (7.5 mmole) of 2,2-bis(4-carboxyphenyl) hexafluoropropane, and 40.96 g of 83% polyphosphoric acid (PPA). The monomers were incorporated into PPA by stirring and heated slowly to 100° C. under a dry nitrogen flow in an oil bath. The solution was heated at 100° C. for a period of 16 hours, 140° C. for one hour, 160° C. for 2 hours, and finally at 185° C. for 24 hours. At the end of the polymerization, the viscous polymer dope was precipitated into water. The resultant fibrous polymer was chopped in a Waring blender, collected by suction filtration, washed with ammonium hydroxide, then soxhlet extracted with water for 24 hours, and finally dried under reduced pressure (0.002 torr) at 100° C. for 24 hours. The polymer yield was 6.27 g. An intrinsic viscosity of 1.37 dl/g was measured in methanesulfonic acid at 30° C., and at a concentration of 0.25 g/dl.

EXAMPLE VI

Copolymer VI Derivatization from Polymer V

Into the bottom of a 250 ml, three-neck, round-bottom flask equipped with a mechanical stirrer, thermometer, and a nitrogen inlet/outlet was charged with 25 g anhydrous dimethylsulfoxide (DMSO). The solvent was stirred under nitrogen for 30 minutes, after at which time 0.07 g of sodium hydride (60% dispersion in oil) was added. The solution was heated to 75° C. for a period of one hour, during which the sodium hydride dissolved and the clear solution took a greenish tint. The solution was cooled to 40° C., and 1.00 g of polymer V (η)=1.37 d/lg, methanesulfonic acid, 30° C.; 0.25 g/dl) was added. The suspension was stirred for 16 hours at 40° C. during which time the polymer completely dissolved and a red, homogenous solution resulted. The solution was cooled to room temperature, and 0.1 g (2.5 mmole) of allyl bromide was added. The mixture was stirred under slightly positive nitrogen for 16 hours during which time, the polymer solution became yellow and finally precipitated out the polymer. The mixture was poured into 500 ml of water and allowed to stir until the polymer was broken into fine suspension, the polymer was collected by suction filtration, and extracted in a Soxhlet extraction apparatus with hexane for 24 hours. The polymer was dried under vacuum (0.002 torr) at 100° C. for 24 hours. The polymer yield was 1.05 g. An intrinsic viscosity of 1.51 dl/g (methanesulfonic acid, 30° C.; 0.25 g/dl) was recorded for the polymer.

EXAMPLE VII

Free Radical Cure of Polymer I

Into a 50 ml Erlenmeyer flask with a stir bar, were placed 0.4904 g (1 mmol) of polymer 1, 0.0033 g (0.02 mmole) of 2,2'-azobisisobutyronitrile and 20 ml of anhydrous tetrahydrofuran. The mixture was stirred until the polymer completely dissolved. The solution was filtered using a medium fritted funnel, poured into a casting dish, and evaporated under nitrogen atmosphere for 24 hours. The resulting film was dried and heated at 64° C. under a positive nitrogen atmosphere for 2 hours. The cured film was found completely insoluble in anhydrous tetrahydrofuran at reflux temperature for 16 hours, indicating extensive crosslinking in the cured polymer.

Having thus described exemplary embodiments of the present invention, it should be noted by those skilled in the art that the disclosures herein are exemplary only and that alternatives, adaptations and modifications may be made within the scope of the present invention.

We claim:

1. A polymer system having repeating units of the formula:

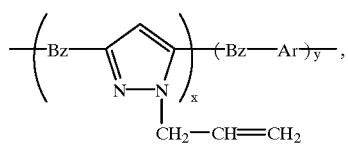

wherein Bz is a benzazole unit selected from the group consisting of

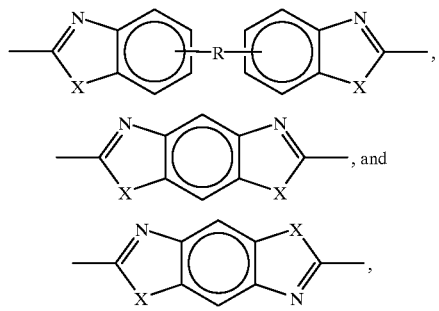

wherein X is —O—, —S— or —NH—, and R is selected from the group consisting of

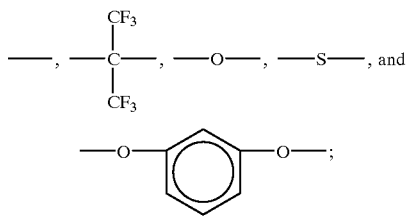

wherein Ar is an aromatic group; and wherein x has a value of about 1.0 to 0.1 and y has a value of 1.0–x.

2. The polymer system of claim 1 wherein x is 1.0, Bz is

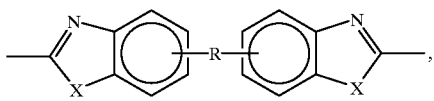

R is —C(CF$_3$)$_2$—, and X is —O—.

3. The polymer system of claim 1 wherein x is 0.5, Bz is

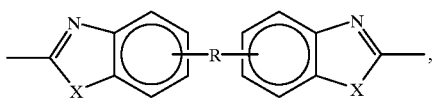

R is —C(CF$_3$)$_2$—, X is —O—, Ar is 2,2-bis(4-phenylene) hexafluoropropane.

4. The polymer system of claim 1 wherein x is 0.375, Bz is

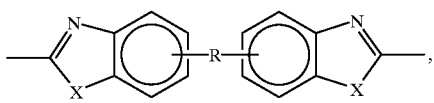

R is —C(CF$_3$)$_2$—, X is —O—, Ar is 2,2-bis(4-phenylene) hexafluoropropane.

* * * * *